June 2, 1936.                R. LEWIS                2,042,609
                         CONTROL DEVICE
              Original Filed June 28, 1932    2 Sheets-Sheet 1
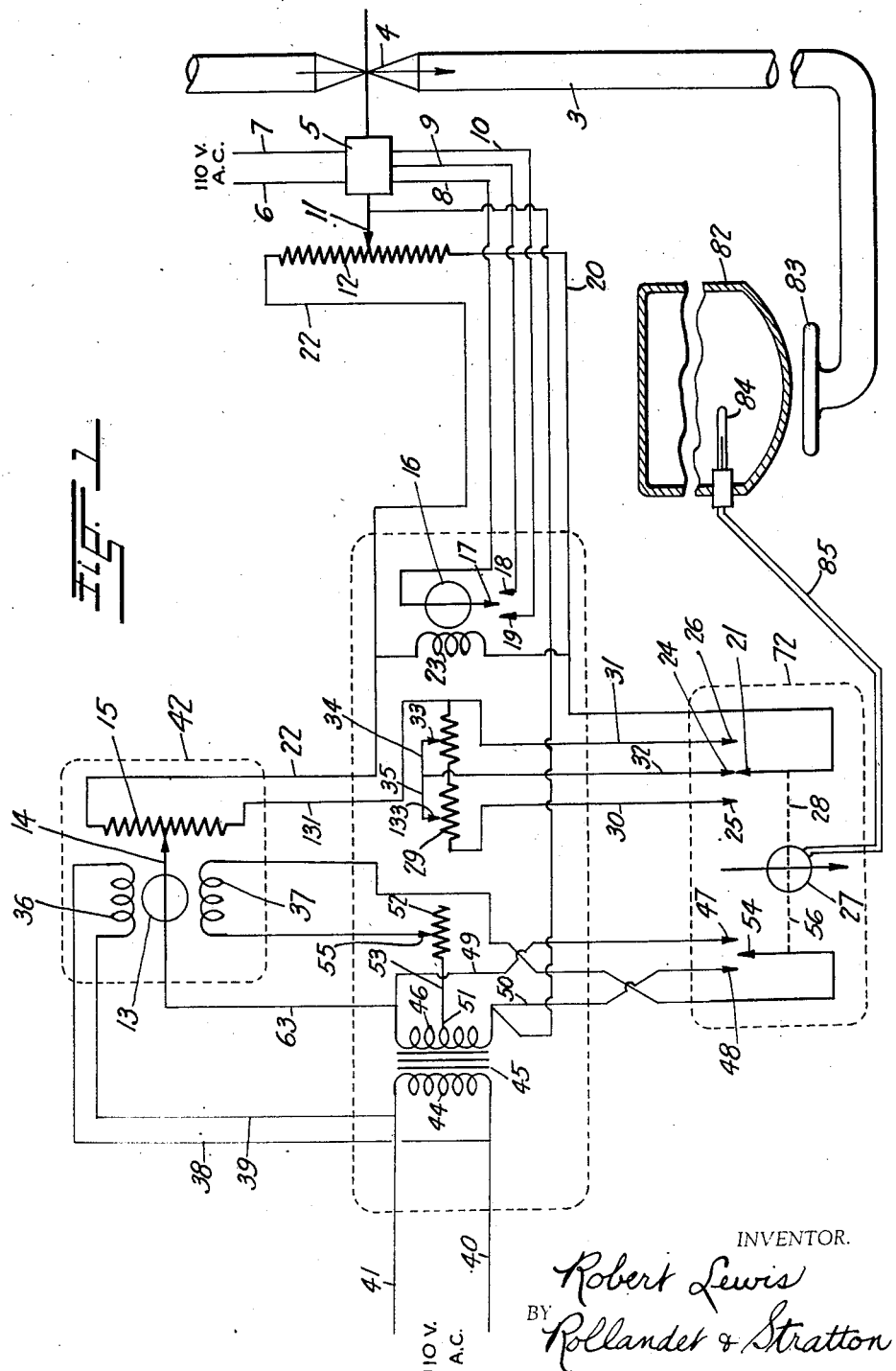
INVENTOR.
Robert Lewis
BY Rollander & Stratton
ATTORNEYS

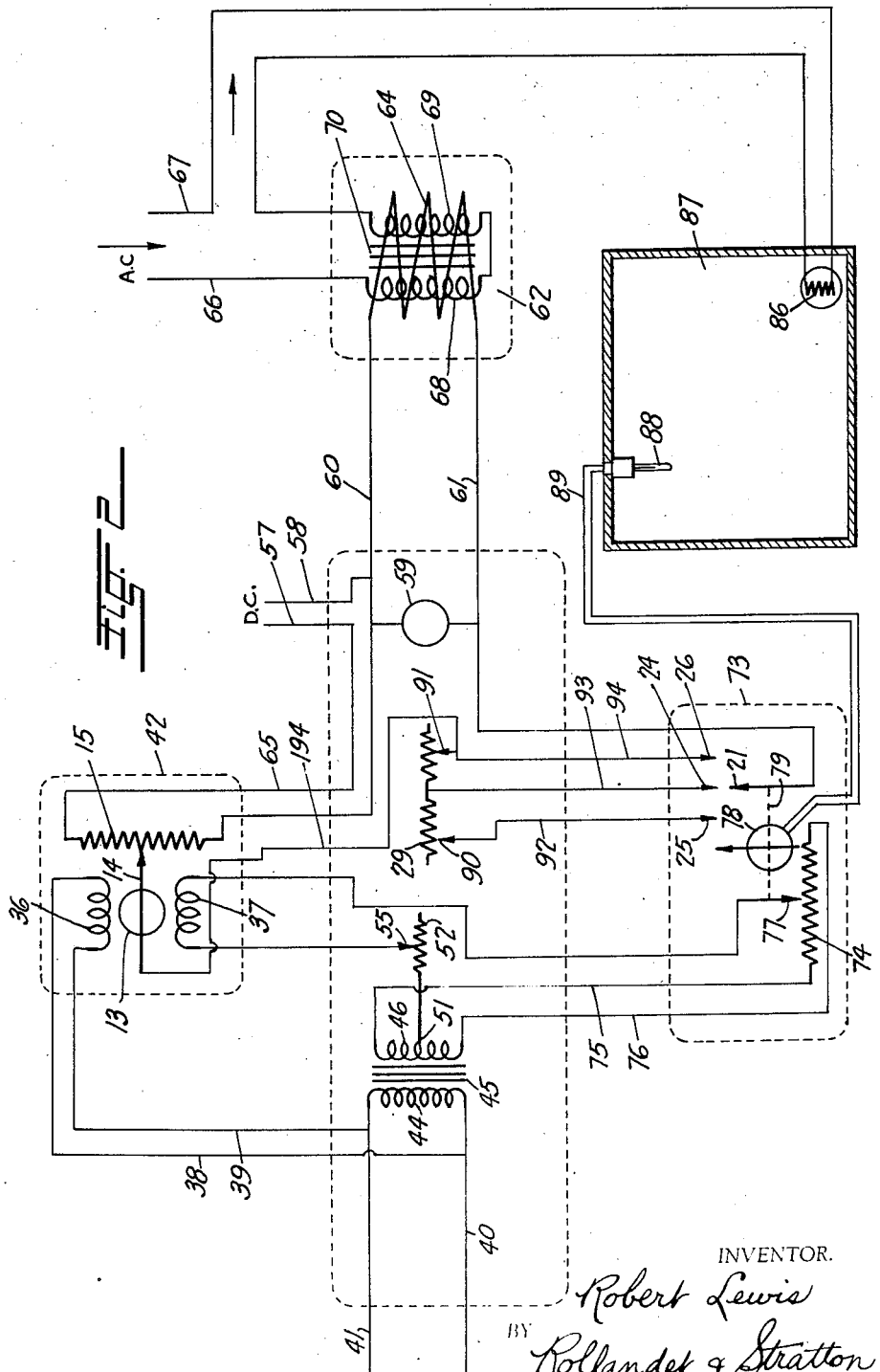

Patented June 2, 1936

2,042,609

UNITED STATES PATENT OFFICE 2,042,609

CONTROL DEVICE

Robert Lewis, Denver, Colo., assignor to The Denver Fire Clay Company, Denver, Colo.

Application June 28, 1932, Serial No. 619,701
Renewed October 9, 1934

14 Claims. (Cl. 236—69)

My invention relates to means for controlling electrical or other apparatus according to the demand for their operation. An important application of my invention is to provide temperature control means. A principal object of the invention is to provide means to automatically regulate apparatus in such a way that existing tendencies of changing conditions are compensated for.

Another object is to provide means that will continuously and automatically set a normal, in order to control the supply of energy or heat in proportion to the demand.

Still another object is to slowly add energy or heat when only a small amount is needed, and to add same proportionately more rapidly as proportionately greater amounts of energy or heat are needed.

Another object is to provide a greater or less predetermined amount of energy or heat, depending upon the demand for same. It is also an object of the invention to add or provide a progressively increased or decreased predetermined amount of energy or heat, where there is a demand for progressively increased or decreased amount of energy or heat. Heretofore heat or energy controls have generally added or supplied a fixed amount of heat or energy irrespective of whether the demand for same is small or great. The present invention, therefore, proportions the supply to the demand.

Further objects reside in novel combinations and arrangements of parts, and in novel details of construction, which will appear in the course of the following description. In the drawings, like reference characters designate similar parts in the two figures.

Figure 1 is a diagrammatic representation of apparatus and electrical means for controlling the passage of fluids through a conduit, regulated by temperature at a given point or points.

Figure 2 is a modified apparatus and electrical means for controlling electrical energy, regulated by temperature at a given point or points.

Referring more in detail to the drawings, the reference numeral 3 in Figure 1 of the drawings indicates a conduit for fluids, such as a gas line for conveying gas to heat a still 82 in an oil refinery. A burner 83 is supplied with fuel by means of the gas in the conduit 3. A thermometer or equivalent means 84 is placed in the still to be affected by the temperature therein. A connection diagrammatically indicated at 85 conveys the changes in the thermometer to a temperature responsive instrument 72, hereinafter described. A valve 4, disposed in the conduit 3, is operated by a reversible motor 5. The motor is connected in an alternating current circuit by wires 6 and 7, for supplying current to the motor. The motor 5, a double field motor or equivalent means, is controlled by three wires 8, 9 and 10. The wire 8 is common to the two fields, but the direction of operation of the motor is determined by whether wire 9 or 10 is included in the circuit with the wire 8.

The motor reciprocates a pointer 11 on a resistor 12, to balance the effect of the operation of a motor-driven potentiometer 42 comprising a reversible motor 13, a movable contact 14 driven by the motor 13, and a resistor 15 engaged by the pointer 14, the connection with which will be described hereinafter. The symbol 13 preferably includes a meter to measure the length of time during which the temperature deviates from the desired value. Since such meter per se forms no part of the present invention, illustration and further description of same appears unnecessary.

The wire 8 connects with a contact of a galvanometer 16 or a relay, depending upon the sensitivity desired. The galvanometer has a contact 17, while the wires 9 and 10 respectively have contacts 18 and 19, disposed to be engaged separately by the contact 17.

One end of the resistor 12 is connected by wire 20 with a movable contact 21 which is controlled by a temperature sensitive or measuring instrument 72. Since such instrument per se forms no part of the present invention, a detailed showing of same is thought unnecessary. An instrument such as shown in prior patents; the following patents to R. P. Brown, issued to him solely or jointly, are cited as examples: 1,422,920; 1,443,165; 1,443,166; 1,446,961; 1,564,518; 1,564,519; 1,707,-652; 1,715,895 and Patent No. 1,607,077 to H. A. Hands and No. 1,296,250 to W. Wyss may be used, for instance, or any other known temperature responsive instrument capable of operating electrical contacts.

The other end of the resistor 12 is connected by a wire 22 with one end of the resistor 15. A coil 23 governing the galvanometer is connected with the wire 20 and 22, in parallel with the resistor 12.

Normally engaging the contact 21 is a contact 24. Contacts 25 and 26 are disposed to be individually engaged by the contact 21. The symbol 27 indicates an operating part of the temperature measuring instrument, which controls contact 21 and moves in into engagement with either one or the other of contacts 25 or 26, to increase or decrease the fluid flow through the conduit 3, as will be fully described. Broken line 28 indicates a mechanical connection between the device 27 and the contact 21.

The contacts 25 and 26 are respectively connected with opposite ends of a resistance 29 by wires 30 and 31, while the contact 24 is connected by a wire 32 with two manually adjustable contacts 33 and 133 by branch wires 34 and 35 respectively. When contacts 21 and 24 are in engagement, which is the normal position, current travels through said contacts, through wire 32, wire 34, contact 33, through an end portion of the coil 29, to wire 131 (a continuation of wire 31). When contacts 21 and 25 are in engagement, current flows through these contacts, through the left end portion of the resistor 29, as shown, through contact 133, wires 35 and 34, contact 33, through the right end portion of the resistor 29 and then through wire 131. When contacts 21 and 26 are in engagement, the current misses the resistor 29 entirely. By this arrangement, a normal or more or less current is supplied, to influence the galvanometer, which in turn controls the circuit of the motor 5.

The wire 131 is connected to the opposite end of the resistor 15 from that joining on the wire 22. Thus the ends of resistors 12 and 15 are respectively connected. In operation the contacts 11 and 14 are moved corresponding amounts. The reversible motor 13 has a voltage or potential coil 36 and a current coil 37. The voltage coil is connected by wires 38 and 39 to wires 40 and 41 respectively in an alternating current circuit.

The wires 40 and 41 supply current to the primary side 44 of a transformer 45. The secondary side 46 is connected with contacts 47 and 48 by wires 49 and 50 respectively. The movable contact 14 is connected with the wire 49 by a wire 63. A fixed center tap 51 on the secondary side of the transformer is connected with a manusually adjustable resistor 52 by a wire 53.

The current coil 37 of the reversible motor 13 is connected with a movable contact 54 and with a manually operable contact 55 on the resistor 52. The resistor controls the speed of the reversible motor 13. The contact 54 has a mechanical connection 56 with the temperature actuating device 27.

The modified embodiment shown in Figure 2 is similar in many respects to that shown in Figure 1. Where the parts are similar, the same reference characters have been repeated, and such parts will not be described again.

In Figure 2, a supply of direct current is supplied to the present demand control by wires 57 and 58, which connect with opposite sides of a gap in wire 65, which wire connects an end of the resistor 15 with the wire 60. A voltage meter 59 between wires 60 and 61 is arranged in parallel with a direct current coil 64 in a reactor 62, hereinafter to be described. The voltage meter measures the difference in potential between wires 60 and 61. The wire 60 is connected with the opposite end of the resistor 15 from the connection with wire 65, and with one end of the direct current coil 64, and the wire 61 is connected with the other end of the coil 64 and with the contact 21.

Contact 25 is connected with a contact 90 by a wire 92, which contact engages the resistor 29. The normal contact 24 connects directly with the resistor 29 by wire 93, while contact 26 is connected with another contact 91 on the resistor 29 by wire 94. A continuation 194 of the wire 94 connects with the movable contact 14.

The normal circuit of these contacts is as follows: supply line 58, wire 60, coil 64, wire 61, contacts 21 and 24, wire 93, portion of the right half, as shown, of resistor 29, contact 91, wire 194, movable contact 14, the upper half (as shown) of resistor 15, wire 65 and back to the other power line 57. The circuit for the contact 25 is the same except that the current flows from contact 21 to contact 25, through wire 92, contact 90, the resistor 29, contact 91, and then through wire 194 as before. The circuit including contact 26 is the same as those described, except that current flows from contact 21, through contact 26, wire 94 and wire 194 as before, eliminating the resistor 29. The other circuits in the drawings are thought sufficiently clear from the description and drawings.

A comparatively large supply of alternating current in wires 66 and 67 is controlled by means of a relatively small amount of direct current in the wires 57 and 58, by means of the reactor. The reactor has windings 68 and 69 and a core 70, which acts as a "choke." The windings are in series in the wire 66.

A heating element 86 is indicated in the circuit 66 and 67. The element is shown in a room or other enclosed space 87. A thermometer 88 is depended in the space. Means 89 transmits temperature changes recorded on the thermometer to a temperature sensitive instrument 73 hereinafter described.

Figure 2 illustrates means for operating motor 13 more rapidly when a greater temperature change is registered by the temperature measuring instrument 73, and operating the motor relatively slower when the temperature change is less. In other words, the speed of the motor is proportional to the temperature change.

Such means comprises a resistor 74, whose terminals are connected with opposite ends of the secondary side 46 of the transformer 45, by wires 75 and 76. A movable contact 77 is electrically connected with one end of the current coil 37 of the motor 13 (the opposite end of said coil being connected with the manually adjustable movable contact 55).

Operating part 78 of the temperature measuring instrument 73 is mechanically connected with the movable contacts 21 and 77, as indicated at 79.

In describing the operation of the invention, it is to be understood that in both forms shown, a predetermined amount of energy is supplied or deducted, and a variable amount is supplied or deducted, in addition. In the form shown in Figure 1, the amount of fluid in the conduit 3 is increased or decreased a definite quantity irrespective of the total amount required, whereas in Figure 2 the amount of electrical energy in the circuit 66, 67 is increased or decreased a definite percentage of the normal amount. The manually adjustable contacts 33 and 133 in Figure 1 and 90 and 91 in Figure 2 respectively control the predetermined amount and percentage of energy that is supplied or deducted, when contacts 25 or 26 are respectively engaged by the circuit closing contact 21. The motor-driven contact 14 determines the variable amount of energy that is added or deducted in addition to the predetermined amount.

When the contact 21 is in engagement with the contact 24, a normal amount of heat or energy is supplied, although this normal fluctuates up or down, depending upon the previously set position of the movable contact 14.

The direction of rotation of the motor 13 depends upon whether the contact 54 is in engagement with contact 47 or 48.

Since the movable contacts 21 and 54 are mechanically joined together, a temperature change will move the contact 21 to engage the contact (26 or 25) to supply or deduct a predetermined amount or percentage of energy or heat, and at the same time the motor 13 will be rotated in a direction to continue to add to or deduct further from the amount of heat. When the desired temperature has been reached, the contact 21 moves back to engagement with the contact 24, which is the normal position, and the motor 13 stops, since the contact 54 is not in engagement with either contact 47 or 48.

When the pointer 21 moves back to the normal position of engagement with contact 24, the movable contact 14 stays in its new position. The effect of this is to change the normal. For instance, if the temperature or energy has fallen and an increased amount of temperature or energy has had to be supplied and the contact 14 has moved to increase the heat or energy a corresponding amount, this increased amount is added to the normal amount in the new normal output. This counteracts or meets the demand where there is a tendency either up or down.

In Figure 1, when there is a temperature change and the contact 21 is moved into engagement with either contact 25 or 26, then current flows through the circuit of the galvanometer coil 23, which causes the galvanometer to actuate the movable contact 17 into engagement with either contact 18 or 19, which causes the motor 5 to rotate in one direction or the other, to move the valve toward an open or closed position.

When the proper amount of fluid has been supplied by the conduit 3 to raise the temperature the proper amount, the temperature sensitive instrument 27 moves the contact 21 to the normal position (in engagement with the contact 24), and the contact 54 is disengaged, which shuts off the motor 13. As soon as the circuit shown in the drawings is counterbalanced; that is, the several resistors are balanced, no more current flows through the galvanometer coil 23 and the contact 17 assumes a non-engaging position, which shuts off the motor 5. The valve 4 is left in the new position until a temperature change is registered by the device 27, when the cycle is repeated.

It should be borne in mind that whenever the temperature in the enclosure 82 rises or falls a predetermined amount from the normal temperature, two quantities or component parts of current are added to or taken from the circuit controlling the heat in the enclosure. The first quantity is fixed and is added or subtracted as a fixed quantity or "lump." Whether this fixed quantity is added or taken away is determined by whether contact 26 or 25 is engaged by contact 21. The second quantity that is simultaneously added or subtracted is not fixed, but progressively increases or decreases until the temperature in 82 again reaches normal. Whether the latter current is being added to or taken from the circuit is determined by whether contact 54 engages contact 47 or 48.

When the temperature in the enclosure 82 returns to normal, the contact 21 again engages the contact 24, which cuts out the fixed quantity or "lump" of current. At the same time, the contact 54 has moved to a neutral position and the motor 13 stops. The contact 14, while the temperature in 82 has been approaching normal, has been progressively increasing or decreasing the amount of current in the circuit controlling the heating element, but when the temperature in the enclosure 82 returns to normal, the motor 13 is stopped and the contact 14 maintains its new position. This tends to correct any discrepancy in the current in the system. For instance, if the temperature has been falling below normal in the enclosure 82, the new position of the contact 14 will allow more current to flow thru the controlled circuit thereafter, to correct the discrepancy.

When the temperature in 82 returns to normal, the only amount of resistance that is cut out of the circuit is the aforementioned fixed quantity, controlled by the resistance 29. The circuit, however, is balanced with the new amount of resistance determined by the new position of the contact 14.

During the balancing of the circuit, the new resistance selected by the contact 16 is balanced by a new resistance in the coil 12, by the movement of the contact 11, in the manner of the well-known Wheatstone bridge. When the resistances 15 and 12 are balanced, no more current travels thru the galvanometer coil 23, and the motor 5 stops.

During the balancing of the circuit, the control motor 13 never reverses. The contact 11 is merely moved to a new position by the motor 5 to balance the circuit.

The operation of the form shown in Figure 2 is similar. There are three principal departures, however, from the operation of Figure 1. First, the circuit for the motor 13 includes the resistor 74 in Figure 2, which makes the speed of the motor 13 proportional to the change in temperature. A small change causes the motor to rotate slowly, etc.

The second change referred to is that a definite percentage is added to or taken from the energy supply in Figure 2 by means of the contacts 90 and 91. This percentage (which may be manually adjustable) is always added or subtracted, in proportion to the total amount of energy.

The third change is that a reactor rather than a valve is operated by the circuit. With the reactor, a relatively small amount of direct current controls a relatively large quantity of alternating current. With no direct current in the coil 64, the alternating current in the wire 66 flows through the coils 68 and 69, which magnetizes the core 70 and sets up a counter E. M. F. (electromotive force), as in the case of the familiar electric "choke", thus retarding the flow of the alternating current through the coils 68 and 69. By adding the direct current to the coil 64, which more or less saturates the core, the counter E. M. F. is eliminated in proportion to the amount of direct current supplied to the coil 64. Thus the amount of alternating current traversing the line 66 is proportional to the supply of direct current in the coil 64.

The voltage meter 59 is arranged in the direct current circuit to measure the difference in potential between wires 60 and 61 and hence indicates the amount of power in the alternating current circuit. The operation of Figure 2 is otherwise as described in connection with Figure 1, which, it is thought, does not have to be repeated here.

It is to be understood that changes may be made in the details of construction and in the arrangements of parts, without departing from the spirit and scope of the invention.

What I claim and desire to secure by Letters Patent is:

1. Temperature control mechanism comprising, a temperature sensitive element, a heater disposed to affect said element, an electrical circuit controlling said heater, means controlled by said element, adapted to alter, by a single step, the quantity of current in the circuit a previously determined amount, motor operated means to progressively continue the change in the amount of current, means to shut off the motor and to shut off the previously determined amount without shutting off the progressive additional change, and means for automatically proportioning the determined amount to the current in the circuit.

2. Temperature control mechanism comprising a motor-driven potentiometer including a reversible motor and a current coil therefor, a transformer having a tapped secondary, the current coil connecting at one end with the tap on the secondary, and the other end of the coil arranged to be connected with either end of the secondary, to run the motor in one direction or the other, a temperature sensitive instrument to connect one or the other end of the secondary with the coil as stated, and a circuit controlled by the potentiometer and in turn controlling the temperature affecting said instrument.

3. Temperature control mechanism comprising a motor-driven potentiometer including a reversible motor having voltage and current coils therefor, a power line, a transformer in the line, the voltage coil being connected with the primary side of the transformer and the current coil being selectively connected with the secondary of the transformer to operate the motor in one direction or the other, a temperature sensitive instrument to control the selective connections of the current coil with the secondary of the transformer, and a circuit controlled by the potentiometer, in turn controlling the temperature affecting said instrument.

4. Temperature control mechanism comprising an electrical circuit controlling a heating medium, a movable contact and a relatively fixed contact in the circuit, said contacts being connected to transmit a normal amount of current, one to the other, when in engagement, a resistor, a contact connected with said resistor to include same in the circuit, the last-mentioned contact being disposed to be engaged by the movable contact when the latter is moved out of engagement with said relatively fixed contact, a potentiometer, which includes said circuit, operated by a reversible motor, a circuit for the motor, contacts in the motor circuit arranged to be selectively engaged to operate the motor in one direction or another, and temperature sensitive means arranged to be affected by the heating medium and adapted to selectively move the movable contact into engagement with the relatively fixed contact or the resistor contact and adapted to cause engagement of the motor circuit contacts, to operate the motor in the desired direction.

5. Temperature control mechanism comprising a circuit to carry a relatively large amperage of alternating current, a reactor in the circuit having a core adapted to choke said current with a counter electromotive force, a direct current coil in the reactor adapted to saturate the core and eliminate the counter electromotive force, in proportion to the amount of direct current supplied to the coil, a direct current circuit for the coil, a reversible motor for controlling the direct current circuit, heating means controlled by alternating current, and temperature responsive means disposed to be affected by the heating means and in turn to control the speed and direction of rotation of the motor.

6. Temperature control mechanism comprising a temperature sensitive instrument, a potentiometer having a reversible motor, heating means arranged to affect the temperature sensitive instrument, the potentiometer including a circuit controlling said heating means, a power circuit, a transformer in the latter circuit, a current coil for the motor, contacts connected with the current coil to connect same with one or the other side of the secondary of the transformer, to operate the motor in one direction or another, the potentiometer being connected to alter the amount of current in its circuit, means also connected in the latter circuit to alter the amount of current therein an additional, predetermined amount, and contacts controlling said means, the temperature sensitive instrument causing selective ones of said contacts to engage, to operate the motor and to actuate said means simultaneously.

7. Temperature control mechanism comprising a temperature sensitive element, a heater disposed to affect said element, an electrical circuit controlling said heater, a motor actuated by said element and controlling the current in said circuit, means apart from the motor to increase or decrease said current a predetermined amount when said element is affected by a change in temperature, and the motor progressively increasing or decreasing the amount of current in said circuit in addition to said predetermined amount.

8. Temperature control mechanism comprising a temperature sensitive element, a heater disposed to affect said element, an electrical circuit controlling said heater, a motor actuated by said element and controlling the current in said circuit, means apart from the motor to increase or decrease said current a predetermined amount when said element is affected by a change in temperature, and automatic means to shut off the motor and to shut off said predetermined amount, when the temperature sensitive element is subjected to a predetermined temperature.

9. Temperature control mechanism comprising a potentiometer including a circuit, means to alter the amount of current in said circuit a predetermined amount, the potentiometer progressively changing the current in the circuit in addition to the predetermined amount, a heater controlled by said circuit, and a temperature sensitive instrument controlling the potentiometer and said means and in turn affected by the heater.

10. Temperature control mechanism comprising a potentiometer including a circuit and a reversible motor, the circuit controlling a heating medium, contacts connected to change the amount of current in the circuit, the motor to progressively make still greater changes in the current, and temperature sensitive means disposed to be affected by heat from said medium and arranged to connect the contacts and to operate the motor, when affected by a temperature change.

11. A temperature control mechanism comprising in combination a potentiometer including a reversible motor and a circuit for controlling a heating medium, means controlled by the temperature for changing the amount of current in the control circuit a predetermined fixed amount, means controlled by the operation of the motor for progressively making further changes in the current in the same direction as the change of the predetermined amount first made, a temperature responsive device positioned to be influenced by the heating medium, and means controlled by the temperature responsive device for effecting the change of the predetermined amount of current in the control circuit and for determining the direction and extent of operation of the motor.

12. Temperature control mechanism comprising a motor-driven potentiometer including a reversible motor having a current coil, a source of electric current supply, of suitable voltage, said current source having a neutral point, one end of the current coil being connected with the neutral point, the free end of the current coil being arranged to be connected with either pole of the current supply to determine the direction of rotation of the motor, means comprising a temperature responsive instrument for connecting the free end of the current coil with one or the other pole of the current supply, and a circuit controlled by the potentiometer, and in turn controlling the temperature affecting said instrument.

13. A temperature control mechanism comprising a motor-driven potentiometer, including a reversible motor having voltage and current coils, a source of electric current supply, the voltage coil being connected across the current supply, a tap to the current supply at a point equipotentially distant from the opposite poles thereof, one end of the current coil being electrically connected with the neutral tap, the free end of the current coil being selectively connected to the electrical current source on either side of the tap to determine the direction of rotation of the motor, means comprising a temperature responsive instrument to control the selective connections of the current coil with the current supply, and a circuit controlled by the potentiometer, in turn controlling the temperature affecting said instrument.

14. Temperature control mechanism comprising a temperature sensitive instrument, a potentiometer having a reversible motor, heating means arranged to affect the temperature sensitive instrument, the potentiometer including a circuit controlling said heating means, a power circuit having a neutral point, the motor having a potential coil connected to the outside wires of the power circuit, a current coil for the motor, one end of the current coil being connected with the neutral point of the power circuit, means for effecting a connection of the free end of the current coil with either side of the power circuit to operate the motor in one direction or the other, the potentiometer being connected to alter the amount of current in its circuit, means also connected with the latter circuit to alter the amount of current therein, an additional, predetermined amount, and contacts controlling said means, the temperature sensitive instrument causing selective ones of said contacts to engage to operate the motor, and to actuate said means simultaneously.

ROBERT LEWIS.